(12) United States Patent
Meyer et al.

(10) Patent No.: US 8,416,694 B2
(45) Date of Patent: Apr. 9, 2013

(54) NETWORK FEEDBACK METHOD AND DEVICE

(75) Inventors: Michael Meyer, Aachen (DE); Hannes Ekstrom, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 11/570,479

(22) PCT Filed: Jun. 22, 2004

(86) PCT No.: PCT/EP2004/006741
§ 371 (c)(1),
(2), (4) Date: Aug. 14, 2007

(87) PCT Pub. No.: WO2005/125116
PCT Pub. Date: Dec. 29, 2005

(65) Prior Publication Data
US 2007/0280115 A1 Dec. 6, 2007

(51) Int. Cl.
*G01R 31/08* (2006.01)
(52) U.S. Cl. .................. 370/236; 370/230.1
(58) Field of Classification Search .......... 370/230.1, 370/236, 235
See application file for complete search history.

(56) References Cited

U.S. PATENT DOCUMENTS

| | | | | |
|---|---|---|---|---|
| 6,621,799 B1* | 9/2003 | Kemp et al. | .................. | 370/282 |
| 7,197,025 B2* | 3/2007 | Chuah | .................. | 370/338 |
| 7,237,034 B2* | 6/2007 | Clarke et al. | .................. | 709/235 |
| 7,289,454 B2* | 10/2007 | Bovo et al. | .................. | 370/252 |
| 7,428,595 B2* | 9/2008 | Deshpande | .................. | 709/235 |
| 2002/0085587 A1* | 7/2002 | Mascolo | .................. | 370/477 |
| 2003/0123394 A1* | 7/2003 | Neale et al. | .................. | 370/235 |
| 2004/0090916 A1* | 5/2004 | Hosein | .................. | 370/235 |
| 2004/0218607 A1* | 11/2004 | Hurtta et al. | .................. | 370/395.21 |
| 2005/0060426 A1* | 3/2005 | Samuels et al. | .................. | 709/238 |
| 2005/0124288 A1* | 6/2005 | Karmi et al. | .................. | 455/3.01 |
| 2005/0135248 A1* | 6/2005 | Ahuja et al. | .................. | 370/235 |
| 2005/0165948 A1* | 7/2005 | Hatime | .................. | 709/235 |
| 2005/0169173 A1* | 8/2005 | Mahdavi | .................. | 370/230 |
| 2005/0213586 A1* | 9/2005 | Cyganski et al. | .................. | 370/395.41 |
| 2005/0254420 A1* | 11/2005 | Wager et al. | .................. | 370/230 |
| 2007/0286070 A1* | 12/2007 | Schliwa-Bertling et al. | .................. | 370/229 |

OTHER PUBLICATIONS

Rose O: "The Q-bit Scheme—Congestion avoidance using rate-adaption" Computer Communication review, Association for Computing Machinery, New York, US, vol. 22, No. 12 Dec. 2003. pp. 46-53 XP001186785.*
The Q-bit Scheme—Congestion avoidance using rate-adaptation, Computer Communication Review, Association for computing machinery, vol. 22, No. 2. p. 30-40.*
Rose O: "The Q-Bit Scheme—Congestion Avoidance Using Rate-Adaptation" Computer Communication Review, Association for Computing Machinery, New York, US, vol. 22, No. 2, Apr. 1, 1992, pp. 29-42, XP000271276.
Mukhtar R G et al: "Efficient Internet Traffic Delivery Over Wireless Networks" IEEE Communications Magazine, IEEE Services Center. Piscataway, N.J. US, vol. 41, No. 12, Dec. 2003, pp. 46-53, XP001186785.

(Continued)

*Primary Examiner* — Mark Rinehart
*Assistant Examiner* — Matthew Hopkins (57) ABSTRACT

A network feedback method and appropriate devices are described, in which a node connected to a link can perform a remote flow control adjustment procedure for adjusting the flow control of a sender of data units being forwarded by node over the link.

19 Claims, 3 Drawing Sheets

OTHER PUBLICATIONS

International Search Report from European Patent Office issued Oct. 18, 2004 for PCT/EP2004/006741.

Itaya N et al: "Dynamic parameter adjustment for available-bandwidth estimation of TCP in wired-wireless networks" Computer Communications, Elsevier Science Publishers BV, Amsterdam, NL, vol. 27, No. 10, Jun. 20, 2004.

Kunniyur et al: "AntiECN Marking: A Marking Scheme for High Bandwidth Delay Connections" 2003 IEEE International Conference on Communications, May 2003.

Allman M et al: "TCP Congestion Control" RFC 2581, Apr. 1999.

Ramakrishnan K et al: "The Addition of Explicit Congestion Notification (ECN) to IP" RFC 3168, Sep. 2001.

* cited by examiner

NETWORK FEEDBACK METHOD AND DEVICE

FIELD OF THE INVENTION

The present invention relates to a network feedback method in a data unit transport network, and to network nodes that implement the network feedback method.

BACKGROUND OF THE INVENTION

Data unit based communication is well known. In data unit based communication an information to be transmitted is divided into a plurality of units, and the individual units are sent over a suitable communication network. The structure of given data units and the rules for handling them are given by a protocol in accordance with which the data units are generated and transmitted. A well-known data unit communication protocol is TCP/IP.

Such units for transporting data may carry a variety of names, such as protocol data units, frames, packets, segments, cells etc., depending on the specific context, the specific protocol used and certain other conventions. In the context of the present document, all such units of data shall generically be referred to as data units.

One important aspect in connection with data unit based communication is that of flow control, i.e. the procedure for controlling the release of individual data units from a data unit sender. The task of flow control is to provide a proper and efficient transport of data units from the sender to the intended receiver, without over-burdening the transporting communication network. Namely, the communication network only has limited transportation capabilities, such that the sending of too many data units at once causes congestion in the network, which in turn leads to a delay and/or loss of data units, such that the goal of efficient data unit transportation would not be achieved.

For TCP, RFC 2581 discloses a basic congestion control algorithm that uses the principle of AIMD (Additive Increase Multiplicative Degrees). As is known, TCP uses the well known window-based flow control method in which a "window" of varying length is moved over the data amount to be sent, in order to determine which data units may be sent at what time. One of the windows kept for flow control purposes in TCP is the so-called congestion window (cwnd), which serves to indirectly keep track of the transportation capabilities of the network. Another such window is the so-called advertised window, which the data unit receiver "advertises" to the data unit sender, thereby informing the data unit sender of the receiving capabilities of the data unit receiver. The data unit sender chooses the smaller of these windows, in order to neither over-burden the network nor the receiver.

TCP uses acknowledgement messages (ACKs) as a means of verifying the correct receipt of data units by the data unit receiver. The flow control window expresses the maximum unacknowledged data amount (maximum number of unacknowledged data units) that a data unit sender may have "in flight" at a given time. On the basis of the received acknowledgements or the lack of received acknowledgments, the data unit sender infers the conditions in the transmission network. The mechanism used is that of appropriately adjusting the congestion window and conducting specific window modification algorithms depending on predetermined thresholds.

More specifically, TCP differentiates between a condition referred to as slow-start, which is given if the congestion window is smaller than a threshold called slow-start threshold (ssthresh), or a condition called congestion avoidance if the congestion window is larger than the slow-start threshold.

In accordance with AIMD the congestion window is increased exponentially during slow-start and linearly during congestion-avoidance. Upon detecting congestion, e.g. by detecting or assuming the loss of a data unit, the congestion window is reduced. If the data loss is assumed on the basis of a time-out, the size of the congestion window is reduced to one data unit and the slow-start threshold is reduced to one half its size. If the loss is assumed on the basis of receiving a third duplicate acknowledgment (DUPACK), then the congestion window is reduced to one half its size.

The assumption underlying the above-described model is that routers in the data unit transmission network react to congestion by dropping data units or by having excessive queuing delays. The information conveying mechanism is thereby very indirect. In order to provide a data unit sender with more direct information, network-feedback systems have been proposed, in which network nodes are capable of conveying explicit information to data unit senders. One such concept is the so-called Explicit Congestion Notification (ECN) as outlined in RfC 3168. ECN assumes that network routers employ so-called Active Queue. Management (AQM), in which signs of impending congestion are noticed, and consequently data unit senders are informed by means of explicit notification. This is done by setting a specific field in the header of a data unit being forwarded, where the data unit receiver conveys the set information to the data unit sender in an acknowledgment message. The data unit sender can then take this information into account for its flow control.

In the paper "AntiECN marking: A marking scheme for high bandwidth delay connections" by Srisankar Kunniyur, a proposal has been made for a type of network feedback in which a router in front of an under-utilized high capacity link signals a TCP sender the possibility of aggressively increasing its sending rate. The scenario envisioned by this paper is one in which a TCP connection is not limited by the bandwidth of the links on its route but is limited by its own congestion-avoidance phase. It is suggested to use a single bit, which when set indicates that the router is under-utilised and that the sender can increase its rate aggressively. Similar to ECN, the AntiECN bit is located in the header of each data unit. The initial value is 1. Each router along the data units route checks to see if it can allow an increase in sending rate. If it can, then the router performs an AND operation of the AntiECN bit with 1 and sets the result in the header. If the router is congested or cannot allow an increase in sending rate, it does an AND operation of the AntiECN bit with 0 and sets the result in the header. The receiver echoes the AntiECN bit back to the sender in an ACK. If the echoed AntiECN bit rate is 1, then the data unit sender can increase its congestion window.

OBJECT OF THE INVENTION

It is the object of the present invention to find an improved network feedback method for better flow control, not only for TCP/IP systems, but for any data unit based communication scheme.

SUMMARY OF THE INVENTION

This object is solved by the subject-matter of the independent claims. Advantageous embodiments are described in the dependent claims.

In accordance with the method of the present invention, one or more characteristics (such as the link transmission rate and the transport delay over the link) of a link in a data unit transport network is monitored for detecting whether a change in one or more of the one or more monitored characteristics has occurred, and if a change has occurred then a remote control procedure is triggered at the node connected to said link, for sending a flow control command to the data unit sender. The sending depends on the difference between a link capacity value before the change in the characteristic and a link capacity value after the change of the characteristic, such that if this difference allows, the node can send a command to the data unit sender for increasing the amount of data it sends or for decreasing the amount of data it sends.

As a consequence, in the concept of the present invention, a node connected to a link is capable of sending remote control commands to a data unit sender, where the performance of the remote control operation is triggered by a change in a characteristic of the link to which the node is connected. The monitoring of the one or more characteristics can be done in the node itself or somewhere else in the network, e.g. in a central link characteristic monitoring station. In the former case the trigger for performing the remote control operation is generated in the node itself, and in the latter case the trigger signal is external of the node.

The present invention provides many advantages with respect to the prior art. One such advantage is that due to the triggering of the remote control operation when detecting a change in a characteristic at a network link, the flow control can be performed faster, more directly and more efficiently than in the prior art. Due to the fact that changes in link characteristics are more frequent and more pronounced in wireless communication networks than in fixed-line networks, the concept of the present application is preferably applied to wireless communication systems.

A further advantage of the present invention is that the intelligence for determining the command in dependence on the change in a characteristic can be kept at the node to which the link is connected, such that no complicated evaluation algorithms must be implemented in the data unit senders, and very simple command information can be transported from the link node to the sender.

According to a preferred embodiment, the node connected to the link and the data unit sender are provided in the same communication network, e.g. the link under observation comprises a wireless connection, the node connected to the link is arranged to control the sending of data units over said link and the data unit sender is a proxy in the same wireless communication network, e.g. a gateway node to another network arranged at the edge of the wireless communication network. The advantage of such a situation is that a dedicated communication can occur between the node and the sender (proxy), without the necessity to adapt the flow control algorithms and mechanisms in other entities involved in the overall end-to-end data unit communication, e.g. the terminals can remain unchanged. In this way, it is possible to overcome a very decisive problem of both the ECN and AntiECN concepts, as these concepts require that each and every entity involved in a data unit communication adheres to the respective concept.

BRIEF DESCRIPTION OF FIGURES

Further aspects and details of the present invention will become apparent from the following detailed description of preferred embodiments, where reference will be made to the accompanying figures in which.

DETAILED DESCRIPTION OF EMBODIMENTS

Although the following preferred embodiments of the present invention will often refer to systems using window-based flow control, and more specifically to systems working in accordance with TCP/IP, the present invention is neither restricted to window-based flow control, nor to TCP/IP systems. The present invention can be applied to any type of data unit transport system.

Figure 1:
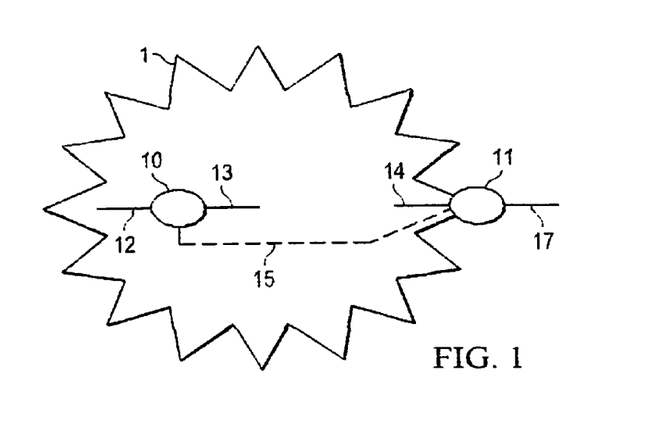
FIG. 1 schematically shows a data unit transport network.

FIG. 1 shows a schematic representation of a data unit transport network 1 comprising a node 10 connected to receive data units from network 1 and to forward data units over a link 12. In the example of FIG. 1, node 10 is in communication with network 1 via the link 12 and another link 13. This example is chosen for simplicity, and the node may also communicate with the network 1 via a larger number of links or connections. Furthermore, although the schematic representation of FIG. 1 only shows the node 10 and another node 11, it will be understood that network 1 comprises a plurality of such interconnected nodes.

FIG. 1 also shows a node 11 that communicates with network 1 via a connection 14. In the example of FIG. 1 network node 11 is located at the edge of the network 1 and can e.g. be a gateway node to a different network. For example, network 1 can be a wireless communication network such as a mobile telephone network, and node 11 can be a gateway node towards some other networks, such as the Internet. Preferably, even if node 11 is not located at the edge of the network as a gateway, it is preferably a proxy for forwarding given data units, such as IP packets.

In keeping with the example of a wireless communication network, node 10 is then preferably a controlling node for controlling communication over link 12, where link 12 comprises a wireless connection. For example, node 10 can be a radio network controller (RNC).

Figure 2:
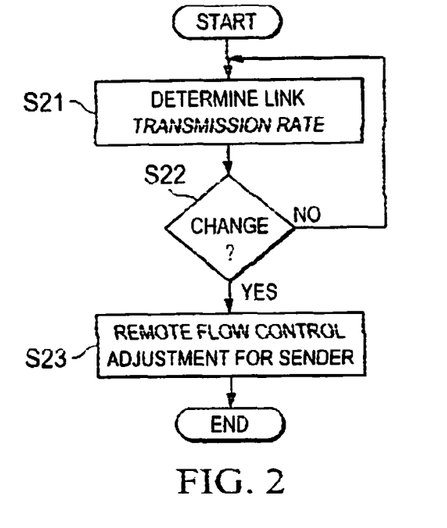
FIG. 2 shows a flow chart of a basic embodiment of the network feedback method of the present invention.

FIG. 2 shows a flow chart of a first embodiment of the method of the present invention. According to the network feedback method shown in FIG. 2, a link transmission rate monitoring procedure comprising steps S21 and S22 is performed, where step S21 determines the link transmission rate for link 12, and step S22 determines whether a change has occurred. If a change has occurred, then this result triggers the performance of a remote flow control adjustment for a sender of data units in step S23. The remote flow control adjustment procedure comprises comparing a first link capacity value old_pc indicative of the capacity of said link prior to the change in transmission rate with a second link capacity in new_pc indicative of the capacity of said link after the change in transmission rate. Depending on the outcome, a flow control adjustment command is sent to a sender of the received data units, e.g. node 11 of FIG. 1.

As an alternative or in addition to monitoring the link transmission rate, steps S21 and S22 could also monitor the transport delay over the link and determine whether a change has occurred. The transport delay can be any value indicative of the time it takes for a data unit to traverse the link. For example, the round trip time (RTT) of the link can be used as the transport delay.

It is noted that the term "sender" refers to any entity that performs a flow control operation with respect to data units being handled by node 10. As such, the "sender" can be the communication end-point or any proxy in between. Preferably, however, the method of the invention is employed in connection with a proxy located within the same communication network 1 as node 10. This has the advantage that certain dedicated information transportation mechanisms can be implemented between node 10 and the sender, without having to modify all entities along the communication path of the data units.

The link capacity values old_pc and new_pc can be chosen in any suitable or desirable way with respect to the type of flow control being used. For example, the link capacity value can be the value of the monitored link characteristic itself, e.g. the link transmission rate. This is preferably done if the flow control at question is rate-based.

Although it is also possible to use the monitored link characteristic (e.g. the transmission rate or transport delay) itself as a link capacity value when performing remote control with respect to a data unit sender that employs window-based flow control, a more preferable mechanism will be described in the following.

Due to the fact that the control windows used in window-based flow control are expressed in terms of a data amount (e.g. in bits or bytes), it is preferable to then also compare a link capacity value expressed in terms of a data amount. Preferably the link capacity value to be compared before and after the change in transmission rate is the so-called pipe-capacity associated with the link 12. The pipe-capacity can be understood as the minimal amount of data that the sender of a flow must send out such that the bandwidth that the link 12 allocates to said flow is fully used. Full utilization means that the proportion of link bandwidth allocated to the given flow is always in full use. Expressed somewhat differently, if one considers the simplified example of link 12 only serving a single flow, then this means that the sender of that flow sends so much data that link 12 is constantly busy, i.e. constantly sending data units without any idle time in between. Again, in other words, the pipe-capacity is the amount of data that the sender brings into flight such that any additional data brought into flight will not increase throughput, as the additional data is queued. Due to this definition of pipe-capacity, it can also be understood as the product of the data rate provided by link 12 to a flow multiplied by the round trip time (RTT) associated with that flow over an unloaded network. An unloaded network means that there is no queuing delay. As a consequence, the value of the unloaded RTT is equal to the difference between the actual RTT of a flow and all queuing delays for that flow.

The estimation of the pipe-capacity will generally consist in determining the time value indicative of the unloaded RTT, and multiplying this value with the data rate DR provided by link 12. The determination of this unloaded RTT can be done in any suitable or desirable way. One example is to calculate the sum of a constant $RTT_{WC}$ and the RTT provided by link 12. $RTT_{WC}$ is a worst-case estimation of the overall unloaded RTT excluding the RTT of the link 12 in question, and may be set to a fixed value of 150 to 300 ms, more preferably 150 to 250 ms. An alternative possibility of estimating the unloaded RTT consists in calculating the queuing delay in a buffer provided in node 10, e.g. by keeping an average of the amount of time that a buffered data unit spends in the queue of node 10, and calculating the difference between the actual RTT of the flow and this queuing delay. The value of the actual RTT for a flow can e.g. be inserted into the data units by the data units sender. The sending of the flow control adjustment command from node 10 to the data unit sender can be done in any suitable or desirable way. The information can e.g. be placed into data units being forwarded by node 10 over link 12 towards the data unit receiver and then mirrored back in acknowledgement messages. Preferably, in order to achieve a more direct and faster communication, node 10 is arranged to modify acknowledgment messages that are presently being passed through node 10 towards the data unit sender, in order to avoid the time it takes to first convey the information to the receiver and then have it mirrored back. As a further alternative of passing information from node 10 to the data unit sender, it is possible to employ dedicated signalling channels. When considering the example of FIG. 1, it is possible that network 1 provides specific signalling channels between nodes 10 and 11 for conveying the flow control adjustment commands from node 10 to node 11.

The structure and content of the flow control adjustment commands can also be chosen in any suitable or desirable way. For example, the flow control adjustment commands can be detailed instructions for the data unit sender to modify the flow control in any of a desired number of ways. Preferably, the flow control adjustment commands are simple commands that instruct the data unit sender to modify a given flow control parameter in a desired way, such as increase or decrease the flow rate, increase or decrease the congestion window, etc. Such commands to increase or decrease a given parameter can specify the amount of increase or decrease, but according to a preferred embodiment, the command simply specify an increase or a decrease, and the data unit sender responds by then increasing or decreasing by a previously determined amount. The advantage in doing so consists in the fact that the flow control adjustment command can be particularly simple, preferably, only two bits (one value for increase, one value for decrease, and one value for doing nothing). Under certain conditions, if e.g. the indication to do nothing can be communicated in some other way, then the adjustment command can even be simplified to a single bit, one value for increase and the other for decrease. An example of such a situation is given further on, where ACK messages are copied and the copied (or duplicated) version is modified to carry the adjustment command. In this case, the absence of a duplicated ACK can be interpreted as "do nothing", such that the actual command in a duplicated ACK can be coded by a single bit.

Now a preferred example will be described, which relates to systems that use window-based flow control, such as TCP. It is furthermore assumed that the data unit sender keeps a congestion window as known from TCP. However, it is noted that the example is not restricted to TCP, and can be put to practice with respect to any system using window-based flow control and keeping a congestion window.

In this preferred example, node 10 estimates the first and second link capacity in terms of the pipe-capacity by calculating the first link capacity value old_pc as old_pc=$(RTT_{WC}+RTT_{LINK}(old))\cdot DR_{LINK}(old)$ and the second link capacity value as new_pc=$(RTT_{WC}+RTT_{LINK}(new))\cdot DR_{LINK}(new)$.

$RTT_{WC}$ is the above-mentioned worst case estimation for the overall RTT without the RTT of link 12, whereas $RTT_{LINK}$ (old) is the RTT of link 12 before the change in transmission rate, $DR_{LINK}$ (old) is the data rate of transmission link 12 before the change in transmission rate, $RTT_{LINK}$ (new) is the RTT of link 12 after the change in transmission rate and $DR_{LINK}$ (new) is the data rate of link 12 after the change in transmission rate.

Although it is possible to compare new_pc and old_pc directly, e.g. by forming the difference and then deriving a flow control adjustment command in any suitable or desirable way, the present example preferably also takes into account the length Q of a data unit queue being kept in a queue buffer contained in node 10. However, it is noted that if node 10 contains no queue buffer, then the values new_pc and old_pc can in any case be directly compared.

In order to compare new_pc and old_pc by taking into account Q, the procedure preferably calculates a parameter cur_cwnd=old_pc+Q, where Q is the length of the queue at the time of change in transmission rate (i.e. immediately preceding the transmission rate change).

cur_cwnd is an estimation of the sum of all congestion window values $cwnd_i$ for the number N of connections or flows sharing link 12:

$$\sum_{i=1}^{N} cwnd_i.$$

The value cur_cwnd as calculated above is an estimate of this aggregate congestion window.

Then a parameter $\Delta$ is calculated as $\Delta$=new_pc−cur_cwnd+$\epsilon$. $\epsilon$ is introduced in order to make the procedure more robust against uncertainties in the pipe-capacity estimations. A typical value of $\epsilon$ can be two times a predetermined data amount, e.g. two times the maximum segment size (MSS) of the data units being handled. It is noted that $\Delta$ can be expressed in units of data (e.g. bits or bytes), but can also be expressed as a multiple of a predetermined data amount, e.g. as a multiple of MSS. If new_pc, cur_cwnd and $\epsilon$ are expressed in units of data, then $\Delta$ can e.g. be calculated as (new pc−cur cwnd+$\epsilon$)/MSS. In the following description, it will be assumed that $\Delta$ is expressed in multiples of a given data amount, e.g. MSS.

The value of data is an indication of the change in cur_cwnd (i.e. the estimate of the aggregate congestion window before the change in transmission rate) that is needed in order to reach new_pc following the rate switch.

Figure 3:
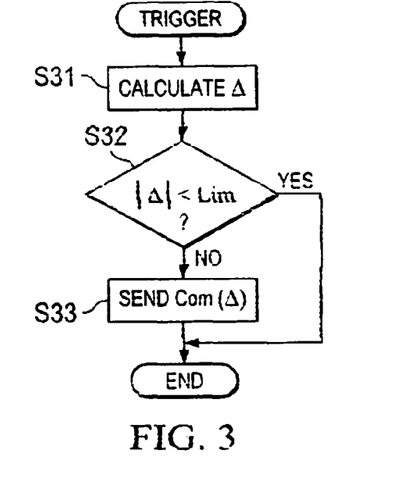
FIG. 3 shows a flow chart of a procedure for generating a remote flow control command.

In general, the procedure for generating a flow control adjustment command has the structure shown in the flow chart of FIG. 3. The method of FIG. 3 is an example of the procedure S23 shown in FIG. 2. After the triggering, step S31 calculates the above-described value $\Delta$. Thereafter, step S32 determines whether the absolute value of $\Delta$ exceeds a predetermined limit Lim (which can e.g. be equal to zero, but is preferably somewhat larger). If the absolute value of $\Delta$ exceeds Lim, then a flow control adjustment command is generated on the basis of the value of $\Delta$ and then sent to the one or more data unit senders that are sending data units to node 10. On the other hand, if the absolute value of $\Delta$ does not exceed Lim, then the procedure ends and no flow control adjustment command is issued, as the change in data rate was too small to merit action.

The flow control adjustment command generated in step S33 can e.g. be equal to the value of $\Delta$, thereby instructing the data unit sender to accordingly change its congestion window.

In an alternative that reduces the amount and complexity of information sent in the flow control adjustment command, a procedure is shown that results in the sending of a simple command to either increase or decrease a given flow control window, such as e.g. the congestion window. This will be explained in connection with the flow chart of FIG. 4. Steps S41 and S42 are identical to corresponding steps S31 and S32 of FIG. 3, such that a renewed description is not necessary. If the outcome of step S42 shows that the absolute value of $\Delta$ exceeds Lim, then step S43 determines whether $\Delta$ is larger than Lim (Lim is a positive value). If this is the case, then $\Delta$ is positive, such that the procedure branches to step S46, in which an increase_cwnd command is sent out, followed by step S47, in which $\Delta$ is reduced by 1. It is noted that in step S47 $\Delta$ is expressed in terms of a predetermined data amount, such as the maximum segment size MSS. After step S47, the procedure loops back to step S42.

Figure 4:
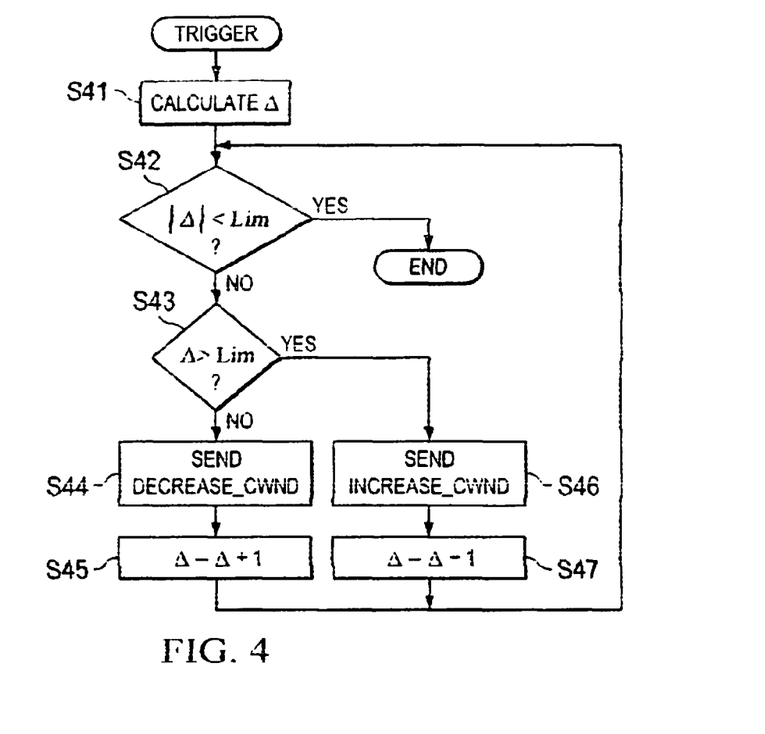
FIG. 4 shows a flow chart of another embodiment of a procedure for generating a remote flow control command.

If the outcome of step S43 shows that $\Delta$ has a negative value, then a decrease_cwnd command is sent out in step S44, followed by step S45 in which $\Delta$ is increased by a value of 1. As in step S47, $\Delta$ is expressed in terms of a predetermined data amount in step S45. Thereafter, the procedure loops back to step S42. By virtue of the loop-back after steps S45 and S47, the steps of sending out decrease_cwnd or increase_cwnd commands are repeated until the absolute value of $\Delta$ falls below Lim or becomes equal to zero.

The data unit sender (e.g. node 11 of FIG. 1) responds to receiving an increase_cwnd or decrease_cwnd command by increasing or decreasing its congestion window cwnd by a predetermined data amount, e.g. the maximum segment size MSS.

Figure 5:
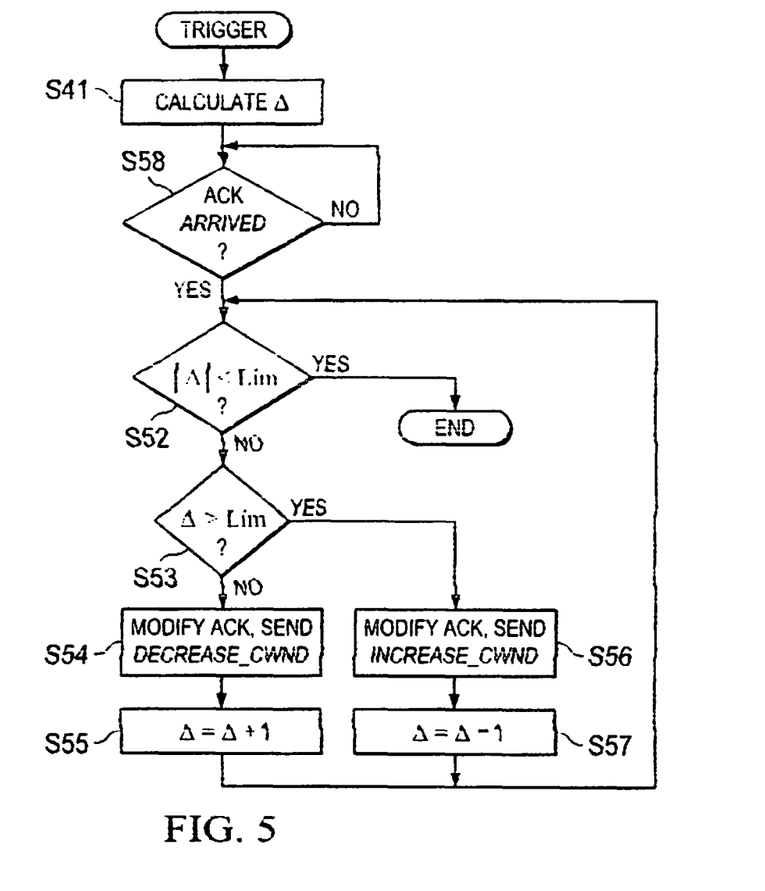
FIG. 5 shows a flow chart of yet another embodiment of a procedure of generating a remote flow control command.

In FIG. 5, a variation of the example of FIG. 4 is shown, in which the commands to decrease or increase the congestion window are communicated to the data unit sender by appropriately modifying acknowledgement messages ACKs. Similar to step S41 of FIG. 4, the method shown in FIG. 5 calculates $\Delta$ in step S51 after having been triggered. Then the procedure passes to step S58 in which it is determined whether an acknowledgement message has arrived. If not, it is waited until an acknowledgement message has arrived, in which case the procedure passes to steps S52 and S53, which are identical to previously described steps S42, S43, respectively, such that a renewed description is not necessary. Step S54 is similar to previously described step S44, except that in addition to generating the decrease_cwnd command, this step also appropriately modifies the ACK received in step S58 in order to place the decrease cwnd command therein. Similarly, step S56 is basically the same as previously described step S46, except that again the ACK is modified to hold the increase_cwnd command. Steps S55 and S57 fully correspond to previously described steps S45 and S47, respectively, such that a renewed description is not necessary.

The modification of the acknowledgement messages performed in steps S54 and S56 can be done in any suitable or desirable way. According to a preferred embodiment, this is accomplished by duplicating the acknowledgment message and changing the contents of one of the two resulting ACKs in order to carry the flow control adjustment command. Both ACKs are then forwarded in the direction of the data unit sender.

The data unit sender operating in accordance with the concept of the present invention is arranged to receive an interpret the duplicated ACK containing the flow control command. Preferably, the modification of the duplicated ACK made by node 10 consists in using a given field of the data unit such that the receiver operating in accordance with the invention is able to understand the conveyed flow control command, but that any other data unit sender not arranged to operate in accordance with the present invention will discard the ACK silently, i.e. without undertaking anything in response.

As already mentioned the data unit sender receiving the flow control adjustment commands from the remote node 10 is able to interpret the commands and to react accordingly. Taking the commands given as examples in FIGS. 4 and 5, a corresponding data unit sender is arranged such that upon receiving the increase_cwnd signal, it sets its congestion window cwnd to the sum of cwnd plus a predetermined data amount (such as e.g. MSS) for the connection or flow where the command was received. In case cwnd cannot be increased further (e.g. because some other flow control window, such as the advertised window, determines the upper limit), the data unit sender silently discards the command without modifying cwnd.

Upon receiving the decrease_cwnd signal, the data unit sender sets cwnd to the difference between cwnd and the predetermined data amount (such as e.g. MSS) for the connection or flow for which the command was received. This ensures that the ACK does not clock out a new data unit. In case cwnd cannot be decreased further (e.g. because it has reached its minimum value), the data unit sender silently discards the command without modifying cwnd.

If the ACK duplicated by the node 10 for the purpose of conveying the control command is itself a so-called DUPACK (Duplicate Acknowledgment Message, i.e. a repeated acknowledgment of a data unit that was already acknowledged previously) then the retransmission timer (REXMT) should be restarted, in order to avoid a spurious timeout. A spurious timeout is a timeout caused by a data unit that was not lost but only excessively delayed.

Upon receiving a "normal" ACK, i.e. a single regular ACK not accompanied by a ACK duplicated by node 10, then the data unit sender should update the congestion window cwnd in accordance with the standard requirements, e.g. if the data unit sender operates according to TCP, it should update cwnd in accordance with RfC 2581.

Following the reception of an increase_cwnd or decrease_cwnd command, the data unit sender preferably sets its slow start threshold ssthresh equal to the congestion window cwnd upon the reception of the first above described "normal" ACK. The reason for this is that the data unit sender should interpret the reception of the "normal" ACK as an implicit signal that it has adjusted its congestion window cwnd to the level desired by the node 10. Hence, if it falls below this value, it should enter slow-start.

In the following, one further special case will be discussed. In conventional TCP, a sender reduces its congestion window cwnd when receiving a third DUPACK. As a consequence, a situation can occur in which a third DUPACK was duplicated by node 10 and contains an increase_cwnd signal. In this way the sender is in fact receiving conflicting commands. According to a preferred embodiment of the present invention, the data unit sender should in this case follow the increase_cwnd command. The reason for this is that the increase_cwnd command results from the fact that an increase in transmission rate on link 12 has occurred. As a consequence, a reduction in cwnd as prescribed by standard TCP in response to a third DUPACK would in fact be counterproductive and would lead to an under-utilization of the newly increased data transmission capability of link 12. Expressed somewhat differently, the receiving of the third DUPACK is the result of actions that occurred before the increase in transmission capability on link 12, such that the concept of the present invention shows that it more quickly and more efficiently can take changes in network conditions into account, such that the remote control of the data unit sender by the node 10 connected to link 12 leads to a faster and more up-to-date reaction on the part of the data unit sender than the standard flow control procedures.

Although the present invention has been described primarily with respect to method steps, it is noted that the present invention can not only be embodied in the form of a method, but also in the form of a computer program product comprising a computer program that is arranged to perform such a method when executed on a node of a data unit transport network. The computer program product can e.g. be a computer program itself or a computer program carrier that carries the computer program.

Furthermore, the present invention can also be embodied in the form of appropriate nodes such as the nodes 10 and 11 described in FIG. 1.

Figure 6:
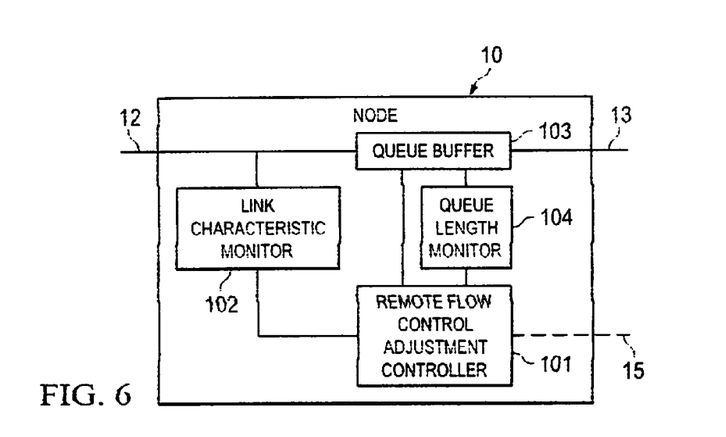
FIG. 6 shows a schematic example of a node capable of generating remote flow control commands in accordance with an embodiment of the present invention.

FIG. 6 shows a schematic diagram of a node 10 that communicates with data unit transport network 1 via a connection 13 and which is connected to link 12. Node 10 comprises a remote flow control adjustment controller 101 for adjusting the flow control of a remote data unit sender of data units received over connection 13. The remote flow control adjustment controller 101 is arranged to be triggered by a change in a characteristic (such as the transmission rate or the transport delay) of link 12 for comparing the first link capacity value old_pc indicative of the capacity of link 12 prior to the change with the second link capacity value new_pc indicative of the capacity of the link 12 after the change, in accordance with the previously described methods. Furthermore, the controller 101 is arranged to send appropriate flow control adjustment commands in accordance with the previously described methods. In this respect, controller 101 can e.g. be connected to network 1 via a dedicated signalling channel 15, in order to communicate the flow control adjustment commands to the data unit sender e.g. node 11.

The triggering can be external or internal. If the triggering is internal, then the node 10 comprises a link characteristic monitor 102 for detecting whether a change in one or more link characteristics has occurred in link 12, where the monitor 102 is appropriately connected to controller 101 for triggering the controller 101 upon detecting a change. The characteristic monitor 102 can e.g. be adapted to monitor the link transmission rate and/or the transport delay.

Furthermore, node 10 preferably also comprises a queue buffer 103 for queuing received data units before forwarding them over link 12. In order to take into account the queue length Q when determining the above-described parameter Δ, node 10 furthermore preferably comprises a queue length monitor 104 appropriately connected to the queue buffer 103 for determining the length Q of the data unit queue in the queue buffer 103. The remote flow control adjustment controller 101 is appropriately connected to the queue length monitor 104 for taking into account the length Q.

If node 10 operates to send the flow control adjustment commands through acknowledgement messages ACK, then there may be a suitable connection between controller 101 and buffer 103, which might also handle the ACKs forwarded in the direction of the data unit sender, such that these ACKs can be appropriately modified e.g. duplicated. Naturally, it is also possible to provide two buffers, one for handling data units sent in the direction of the receiver, and one for handling ACKs sent in the direction of the sender.

As a dimension, link 12 preferably comprises a wireless connection, and node 10 is arranged for controlling traffic over said wireless connection, e.g. node 10 is a radio network controller (RNC) of a wireless radio communication network.

It is noted that the above-described elements 101, 102, 103 and 104 can be provided as hardware, software or any suitable combination of hardware and software. For example, they can be code parts of a computer program running in a programmable processor that is connected to a suitable memory.

Figure 7:
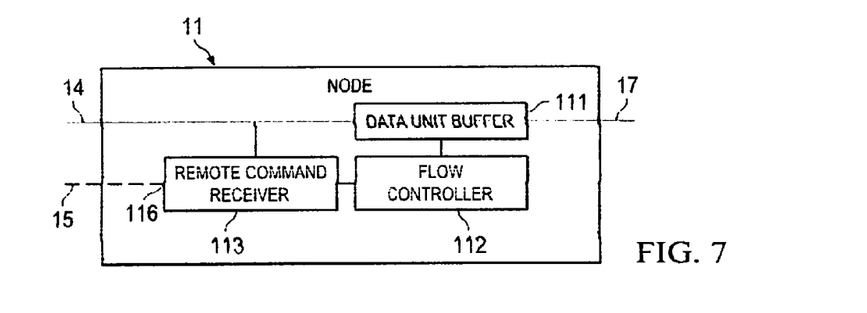
FIG. 7 shows a schematic example of a data unit sender capable of receiving and understanding the remote flow control commands.

FIG. 7 is a schematic representation of a node 11, which communicates with network 1 via a connection 14 and can be connected to a different network (e.g. the Internet) via a connection 17. Node 11 comprises a remote command receiver 113 appropriately connected to network 1 for receiving and identifying remote flow control adjustment command sent by one of the other nodes of the network 1, e.g. node 10. A flow controller 112 is connected to the remote command receiver 113 for adjusting the flow control in response to the flow control adjustment commands, in the ways described previously in connection with the methods of adapting the flow control in a data unit sender. The remote command receiver 113 is appropriately connected to network 1, depending on the chosen way of sending the remote flow control adjustment commands. If the flow control adjustment commands are sent via the dedicated signalling channel 15 (see FIG. 6), then node 11 comprises a corresponding receiving input 16 for the dedicated signalling channel. If on the other hand the flow control adjustment commands are sent in ACKs, then the remote command receiver 113 is appropriately connected to e.g. connection 14 for reading the ACKs.

As can be seen, node 11 preferably comprises a data unit buffer 111 for holding both data units to be sent in the direction of network 1 via connection 14 as well as data units sent in the direction of the other network sent via connection 17. Flow controller 112 is appropriately connected to the buffer 111 for managing the sending of the data units.

The flow controller 112 is arranged to appropriately react to the flow control adjustment commands, e.g. to increase or decrease a flow control window (such as the congestion window cwnd) by a predetermined amount (such as the maximum segment size MSS) if the flow control adjustment commands are commands to increase or decrease the flow control window.

As already mentioned previously, node 11 is preferably a proxy located at the edge of a wireless communication network of which the node 10 described in FIG. 6 is preferably also a part.

The previously described elements 111, 112 and 113 of node 11 can be provided by hardware, software or any suitable combination of hardware and software. For example, they can be code parts of a computer program running on a programmable processor connected to suitable computer memory.

Although the present invention has been described by way of preferred embodiments, this only serves to convey a clearer understanding, but is not intended to restrict the invention. Much rather, the invention is defined by the appended claims. Reference numerals in the claims serve to make the claims easier to read, but do not intend to be limiting.

The invention claimed is:

1. A network feedback method in a data unit transport network that comprises a controlling node connected to receive data units from a proxy node and to forward said received data units over a link to a data unit receiver, said method comprising the following steps performed at the controlling node:
performing a link characteristic monitoring procedure for detecting whether a change has occurred in said link,
triggered by said link characteristic monitoring procedure having detected a change in a characteristic of said link, performing a remote flow control adjustment procedure for adjusting the flow control of said data units from said proxy node, wherein the remote flow control adjustment procedure includes the steps of:
comparing a first link capacity value indicative of the capacity of said link prior to said change in link capacity and a second link capacity value indicative of the capacity of said link after said change in link capacity,
depending on the outcome of the comparing step, sending a flow control adjustment command to said proxy node; and
wherein said controlling node is arranged to queue said received data units before forwarding them over said link, and said comparing step adds a length of said queue to the first link capacity value, where said link capacity is based on a transmission rate, and where the length of the queue is a number of received data units queued in a buffer at the time of said change in link capacity.

2. The method of claim 1, wherein said link characteristic monitoring procedure comprises monitoring one or both of a transmission rate of said link and a time value indicative of a transport delay over said link.

3. The method of claim 1, wherein said comparing step comprises comparing the difference between said second link capacity value and the sum of said first link capacity value and said queue length with a predetermined threshold.

4. The method of claim 1, wherein said flow control adjustment command is a command to increase or decrease a flow control window by a predetermined data amount.

5. The method of claim 1, wherein said data units are sent in accordance with a protocol that provides for said data unit receiver to send acknowledgment messages to said proxy node, where said step of sending said flow control adjustment command comprises setting said flow control adjustment command in one or more acknowledgement messages.

6. The method of claim 5, wherein said setting of said flow control adjustment command in one or more acknowledgement messages comprises
duplicating an acknowledgment message,
setting the flow control adjustment command in one of the two resulting acknowledgment messages, and
forwarding both resulting acknowledgment messages to said proxy node.

7. The method of claim 5, wherein said flow control adjustment command is constituted by a single dedicated bit.

8. The method of claim 1, wherein said network is a wireless communication network, said link comprises a wireless connection, and said controlling node is arranged for controlling traffic over said wireless connection.

9. The method of claim 1, wherein said comparing step further comprises:
calculating a parameter cur_cwnd by adding the first link capacity value and a value associated with the length of the queue at the time of the change in the transmission rate;
calculating a parameter $\Delta$ by subtracting the parameter cur_cwnd from the second link capacity and adding a parameter $\epsilon$, where the parameter $\epsilon$ is a value introduced to address uncertainties in the first link capacity value and the second link capacity value;
determining if an absolute value of the parameter $\Delta$ exceeds a predetermined limit;
if yes, then the flow control adjustment command is generated based on a value of the parameter $\Delta$; and
if no, then no flow control adjustment command is issued as the change in the transmission rate was too small to merit action.

10. A controlling node in a data unit transport network, said controlling node being connected to receive data units from a proxy node in said data unit transport network and to forward said received data units over a link to a data unit receiver, said controlling node comprising:
- a remote flow control adjustment controller for adjusting the flow control of the proxy node, where the remote flow control adjustment controller is arranged to be triggered by a change in a characteristic of said link after comparing a first link capacity value indicative of a capacity of said link prior to said change of said characteristic and a second link capacity value indicative of the capacity of said link after said change of said characteristic, and depending on the outcome of the comparing step sending a flow control adjustment command to said proxy node;
- a queue buffer for queuing said received data units before forwarding there over said link, and
- a queue length monitor for determining the length of a data unit queue in said queue buffer, where said remote flow control adjustment controller is arranged to add a length of said queue to the first link capacity value, where said link capacity is based on a transmission rate, and where the length of the queue is a number of received data units queued in a buffer at the time of said change in link capacity.

11. The controlling node of claim 10, wherein said remote flow control adjustment controller is arranged to be triggered by a change in one or both of a transmission rate of said link and a time value indicative of a transport delay over said link.

12. The controlling node of claim 10, comprising a link characteristic rate monitor for detecting whether a change in said characteristic has occurred in said link and triggering said remote flow control adjustment controller upon detecting a change in said characteristic.

13. The controlling node of claim 10, wherein said flow control adjustment controller is arranged to compare the difference between said second link capacity value and the sum of said first link capacity value and said queue length with a predetermined threshold.

14. The controlling node of claim 10, wherein said flow control adjustment command is a command to increase or decrease a flow control window by a predetermined data amount.

15. The controlling node of claim 10, wherein said data units are sent in accordance with a protocol that provides for the data unit receiver to send acknowledgment messages to the proxy node, and said flow control adjustment controller is arranged to set said flow control adjustment command in one or more acknowledgement messages.

16. The controlling node of claim 15, wherein said flow control adjustment controller comprising a:
- means for duplicating an acknowledgment message, to set the flow control adjustment command in one of the two resulting acknowledgment messages, and to forward both resulting acknowledgment messages to said proxy node.

17. The controlling node of claim 10, wherein said network is a wireless communication network, said link comprises a wireless connection, and said remote flow control adjustment controller is arranged for controlling traffic over said wireless connection.

18. The controlling node of claim 10, wherein the remote flow control adjustment controller is arranged for adjusting the flow control adjustment command by: calculating a parameter cur_cwnd by adding the first link capacity value and a value associated with the length of the queue at the time of the change in the transmission rate;
- calculating a parameter $\Delta$ by subtracting the parameter cur_cwnd from the second link capacity and adding a parameter $\epsilon$, where the parameter $\epsilon$ is a value introduced to address uncertainties in the first link capacity value and the second link capacity value;
- determining if an absolute value of the parameter $\Delta$ exceeds a predetermined limit;
  - if yes, then the flow control adjustment command is generated based on a value of the parameter $\Delta$: and
  - if no, then no flow control adjustment command is issued as the change in the transmission rate was too small to merit action.

19. A network feedback method in a wireless network that comprises a controlling node connected to receive data units from a gateway node and to forward said received data units over a wireless connection to a terminal, said method comprising the following steps performed at the controlling node:
- performing a link characteristic monitoring procedure for detecting whether a change has occurred in said wireless connection,
- triggered by said link characteristic monitoring procedure having detected a change in a characteristic of said wireless connection, performing a remote flow control adjustment procedure for adjusting the flow control of said data units from said gateway node, wherein the remote flow control adjustment procedure includes the steps of:
- comparing a first link capacity value indicative of the capacity of said link prior to said change in link capacity and a second link capacity value indicative of the capacity of said wireless connection after said change in link capacity,
- depending on the outcome of the comparing step, sending a flow control adjustment command to said gateway node; and
- wherein said controlling node is arranged to queue said received data units before forwarding them over said wireless link, and said comparing step adds a length of said queue to the first link capacity value, where said link capacity is based on a transmission rate, and where the length of the queue is a number of received data units queued in a buffer at the time of said change in link capacity.

* * * * *

UNITED STATES PATENT AND TRADEMARK OFFICE
CERTIFICATE OF CORRECTION

| | |
|---|---|
| PATENT NO. | : 8,416,694 B2 |
| APPLICATION NO. | : 11/570479 |
| DATED | : April 9, 2013 |
| INVENTOR(S) | : Meyer et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 309 days.

In the Specification:

In Column 2, Line 23, delete "Queue." and insert -- Queue --, therefor.

In the Claims:

In Column 12, Line 38, in Claim 6, delete "comprises" and insert -- comprises: --, therefor.

In Column 13, Line 19, in Claim 10, delete "there" and insert -- them --, therefor.

In Column 13, Line 54, in Claim 16, delete "comprising a:" and insert -- comprising: --, therefor.

In Column 14, Line 22, in Claim 18, delete "Δ:" and insert -- Δ; --, therefor.

Signed and Sealed this
Thirteenth Day of August, 2013

Teresa Stanek Rea
*Acting Director of the United States Patent and Trademark Office*